(12) United States Patent
Hikmet et al.

(10) Patent No.: US 10,324,247 B2
(45) Date of Patent: Jun. 18, 2019

(54) OPTICAL DEVICE FOR PRODUCING HIGH BRIGHTNESS LIGHT

(71) Applicant: KONINKLIJKE PHILIPS N.V., Eindhoven (NL)

(72) Inventors: Rifat Ata Mustafa Hikmet, Aachen (DE); Petrus Theodorus Jutte, Aachen (DE); Roman Hohn, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 15/575,030

(22) PCT Filed: May 11, 2016

(86) PCT No.: PCT/EP2016/060509
§ 371 (c)(1),
(2) Date: Nov. 17, 2017

(87) PCT Pub. No.: WO2016/188744
PCT Pub. Date: Dec. 1, 2016

(65) Prior Publication Data
US 2018/0143368 A1    May 24, 2018

(30) Foreign Application Priority Data

May 26, 2015 (EP) .................................. 15169108

(51) Int. Cl.
*F21K 9/64*    (2016.01)
*F21V 8/00*    (2006.01)
(Continued)

(52) U.S. Cl.
CPC ................ *G02B 6/005* (2013.01); *F21K 9/64* (2016.08); *F21V 7/0091* (2013.01); *G02B 6/002* (2013.01);
(Continued)

(58) Field of Classification Search
CPC ................................ G03B 21/204; F21K 9/64
See application file for complete search history.

(56) References Cited

U.S. PATENT DOCUMENTS 7,806,556 B2 * 10/2010 Wu ........................ F21V 29/004
362/235
7,923,741 B1 * 4/2011 Zhai ........................ H01L 33/54
257/100
(Continued)

FOREIGN PATENT DOCUMENTS

JP    2015094824 A1    5/2015

OTHER PUBLICATIONS

EPO as ISA, "International Search Report and Written Opinion" dated Jun. 20, 2016 from International Application No. PCT/EP2016/060509, filed May 11, 2016, 12 pages.
(Continued)

*Primary Examiner* — Julie A Bannan
(74) *Attorney, Agent, or Firm* — Brian D. Ogonowsky; Patent Law Group LLP

(57) ABSTRACT

An optical device is provided. The optical device comprises a light converting member arranged to at least party convert incoming light of a first wavelength into light of a second wavelength, to emit light of the second wavelength, and to reflect at least a part of the light of the first wavelength; and a light guide comprising a light entrance and a light exit, the light guide being arranged to guide incoming light of the first wavelength from the light entrance to the light converting member and to guide light emitted and/or reflected from the light converting member to the light exit. The light converting member and the light exit are at opposite surfaces of the light guide. The light converting member and the light exit are arranged along a main optical axis of the light guide, and
(Continued)

the light entrance is arranged at a geometrical envelope surface surrounding the main optical axis of the light guide.

14 Claims, 3 Drawing Sheets

(51) Int. Cl.
    *G02B 27/10*     (2006.01)
    *G02B 27/14*     (2006.01)
    *G03B 21/20*     (2006.01)
    *F21V 7/00*     (2006.01)
    *G02B 5/10*     (2006.01)
    *G02B 5/18*     (2006.01)
    *F21V 29/505*     (2015.01)
    *F21Y 115/10*     (2016.01)

(52) U.S. Cl.
    CPC ......... *G02B 6/0016* (2013.01); *G02B 6/0028* (2013.01); *G02B 6/0031* (2013.01); *G02B 6/0045* (2013.01); *G02B 6/0085* (2013.01); *G02B 27/1006* (2013.01); *G02B 27/14* (2013.01); *G03B 21/204* (2013.01); *G03B 21/2066* (2013.01); *F21V 29/505* (2015.01); *F21Y 2115/10* (2016.08); *G02B 5/10* (2013.01); *G02B 5/18* (2013.01)

(56) References Cited

U.S. PATENT DOCUMENTS

| | | |
|---|---|---|
| 2005/0270775 A1 | 12/2005 | Harbers et al. |
| 2006/0203468 A1* | 9/2006 | Beeson ................ G02B 27/286 362/84 |
| 2009/0296368 A1* | 12/2009 | Ramer ................. F21V 14/003 362/84 |
| 2014/0022512 A1* | 1/2014 | Li ............................ F21V 9/00 353/31 |
| 2014/0049943 A1* | 2/2014 | Brick ................... G02B 6/0028 362/97.1 |
| 2014/0063779 A1* | 3/2014 | Bradford .............. F21K 9/1375 362/84 |
| 2014/0166902 A1* | 6/2014 | Berben .................... F21V 9/16 250/458.1 |
| 2014/0204398 A1 | 7/2014 | Sato et al. |

OTHER PUBLICATIONS

Extended European Search Report dated Nov. 16, 2015 from European Patent Application No. 15169108.6 filed May 26, 2015, 8 pages.

EP Office Action dated Jul. 2, 2018, European Patent Application No. 16722188.6, 5 pages.

\* cited by examiner

Prior art Fig. 1

OPTICAL DEVICE FOR PRODUCING HIGH BRIGHTNESS LIGHT

CROSS-REFERENCE TO RELATED APPLICATIONS

The present application is a § 371 application of International Application No. PCT/EP2016/060509 filed on May 11, 2016 and titled "AN OPTICAL DEVICE FOR PRODUCING HIGH BRIGHTNESS LIGHT," which claims the benefit of European Patent Application No. 15169108.6 filed on May 26, 2015. International Application No. PCT/EP2016/060509 and European Patent Application No. 15169108.6 are incorporated herein.

FIELD OF THE INVENTION

The invention relates to an optical device for producing high brightness light. The present invention also relates to a lighting system comprising such an optical device.

BACKGROUND OF THE INVENTION

Illumination systems for generating high brightness illumination are interesting for various applications including spots, stage-lighting, headlamps and digital light projection.

High brightness light with a desirable spectral distribution may be obtained by a system 1, see FIG. 1, using a bright light source 10 such as a light emitting diode, LED, or a laser where a high intensity light beam of a first wavelength 15 (e.g. blue light) emitted by the light source is directed towards an optical device comprising a light converting member 20 placed on a static heat sink 30. A dichroic reflector 40 is arranged to selectively reflect the light of the first wavelength 15 towards the optical device. Hence, the light converting member 20 is illuminated with a focused beam of light of the first wavelength 15. Light of the first wavelength 15 is partially converted to light of a second wavelength 25 (e.g. yellow light) by the light converting member 20. White light is obtained when light of the first and second wavelengths are mixed.

In such a setup, in order to achieve good heat dissipation from a phosphor light converting member combined with a high luminous efficiency, US20140166902A1 discloses a wavelength conversion body comprising a light guide body being monolithically connected to the phosphor body. Extending such construction for further improvement of heat dissipation, US20050270775A1 discloses a system, in so far similar to the one shown in FIG. 1, spatially separating the light source from the phosphor by a color separation element, as e.g. dichroic reflector 40 of FIG. 1, for prohibiting converted light returning to the light source.

However, such dichroic reflector 40 reduces the intensity of the first light wavelength 15 emitted by the system. Moreover, the dichroic reflector also affects the color of the combined light. Furthermore, in the arrangement the lens 35 used for focusing and collecting the converted light 25 is not efficient enough to collect all the emitted light.

SUMMARY OF THE INVENTION

It is an object of the present invention to overcome at least some of the above problems, and to provide an optical device with improved light output.

According to a first aspect an optical device for producing high brightness light is provided. The optical device comprises a light converting member arranged to at least partly convert incoming light of a first wavelength into light of a second wavelength, to emit light of the second wavelength, and to reflect at least a part of the light of the first wavelength, and a light guide comprising a light entrance and a light exit, the light guide being arranged to guide incoming light of the first wavelength from the light entrance to the light converting member and to guide light emitted and/or reflected from the light converting member to the light exit. The light converting member and the light exit are arranged at opposite surfaces of the light guide.

The light converting member comprises a wavelength converting element. The wording wavelength converting element should be understood as any element that converts light of a first wavelength to light of a second wavelength. The wavelength conversion may be due to luminescence, fluorescence, and/or phosphorescence providing generation of a Stokes shift in the wavelength of the converted emitted light relative to the wavelength of the illuminating light.

The wording light guide should be understood as any element being arranged to guide light from one portion in space to another portion in space by preferably reflecting the light on surfaces of the light guide.

The light guide provides for both efficient in-coupling of the light of the first wavelength and concentrating the in-coupled light onto the light converting element. The light guide further provides for collimating outgoing light of the first and second wavelengths.

The light converting member and the light exit are arranged along a main optical axis of the light guide. The light entrance is arranged at a geometrical envelope surface surrounding the main optical axis of the light guide. Hence, the light of the first wavelength is coupled into the light guide from the side of the light guide.

By arranging the light entrance at the geometrical envelope surface surrounding the main optical axis of the light guide shadowing effects often arising when directing the light of the first wavelength towards the light converting member may be avoided.

The light entrance is separated from the light exit.

The light converting member may be arranged at a focal point of the light guide. By this the size of the light converting member and hence the optical device as a whole may be kept to a minimum. Further, the efficiency for wavelength conversion may be optimized.

The light converting member may be arranged at a point where the light concentration, i.e. power per surface area, is the highest within the light guide.

The light guide may have a parabolic shape. This provides for an efficient guidance of incoming light of the first wavelength towards the light converting member as well as for an efficient guidance of outgoing light of the first and second wavelengths from the light converting member. The parabolic shape of the light guide also provides for efficient collimation of the outgoing light.

The light guide may be a compound parabolic concentrator, CPC. Hence, heat produced in the light converting member may be efficiently transported away from the light converting member. This increases the efficiency of the light conversion in the light converting member. The CPC may be made of a highly heat conducting material. Examples of such material are yttrium aluminum garnet, YAG, sapphire or $CaF_2$. Hence, a good heat management is achieved.

The light guide may be a parabolic reflector. The parabolic reflector may comprise a metal, a ceramic material or a glass material. The parabolic reflector may comprise a reflective surface comprising Al, Ag or a multilayer structure. It may also make use of total internal reflection (TIR).

In the case the light guide is a parabolic reflector the optical device preferably also comprises a transparent heat conducting element arranged on top of the light converting member such that in-coming and out-going light to and from the light converting member may arrive and leave the light converting member and such that heat produced in the light converting member may be efficiently transported away from the light converting member. Hence, a good heat management is achieved.

The optical device may also comprise a reflective heat conducting element. The reflective heat conducting element may be arranged below the light converting member. By arranging elements working as heat sinks both on top and below the light converting member the efficiency of transporting heat away from the light converting member may be further improved. Hence, a good heat management is achieved.

The light entrance may comprise a mirror. Alternatively or in combination, the light entrance may comprise a diffraction grating. Efficient in-coupling of light into the light guide may then be achieved.

The light guide may comprise a plurality of light entrances. This may increase the power and light output. This may also improve the homogeneity of the beam profile of the outgoing light from the optical device.

According to a second aspect a lighting system is provided. The lighting system comprises an optical device according to the above, and a light source arranged to emit light of a first wavelength. The light source may be monochromatic. The light source may comprise a laser diode and/or a light emitting diode, LED. The light source may be a high intensity light source. The optical device is arranged to have high luminance. The luminance from the optical device is preferably more than 0.5 $GCd/m^2$, more preferably more than 1 $GCd/m^2$, and most preferably more than 3 $GCd/m^2$.

The lighting system may further comprise an additional light guide arranged to guide light from the light source to the light entrance of the optical device. The additional light guide may e.g. be in the form of an optical fiber.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claims, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to the appended drawings showing embodiments of the invention. The figures should not be considered limiting the invention to the specific embodiment; instead they are used for explaining and understanding the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully conveying the scope of the invention to the skilled person.

Figure 1:
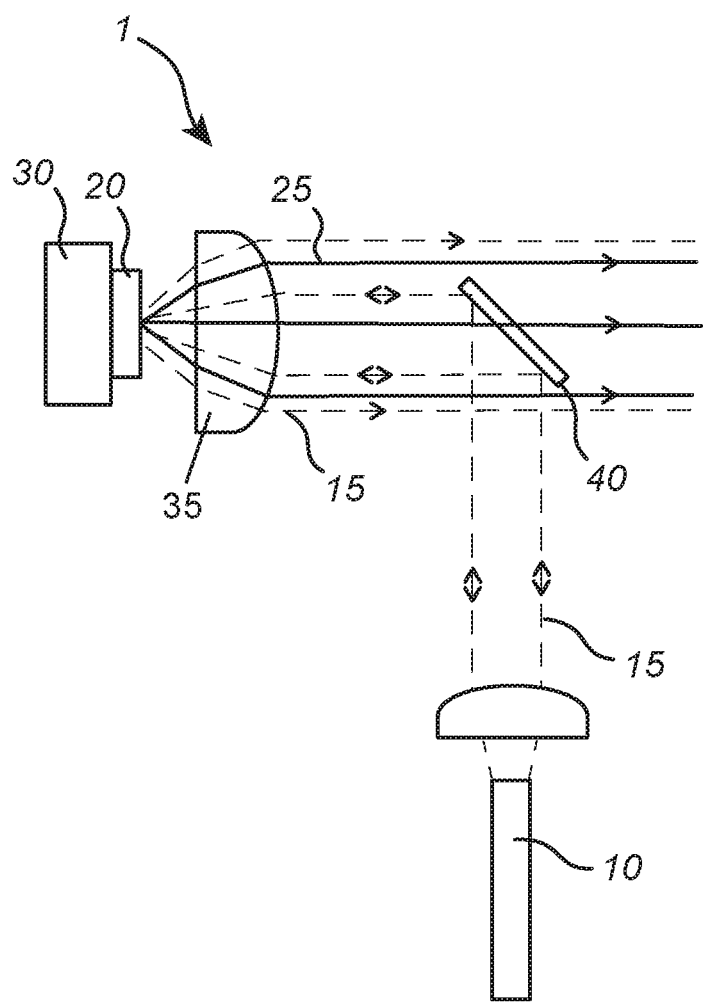
FIG. 1 is a schematic cross sectional side view of a prior art lighting system for producing high brightness light.
Figure 2:
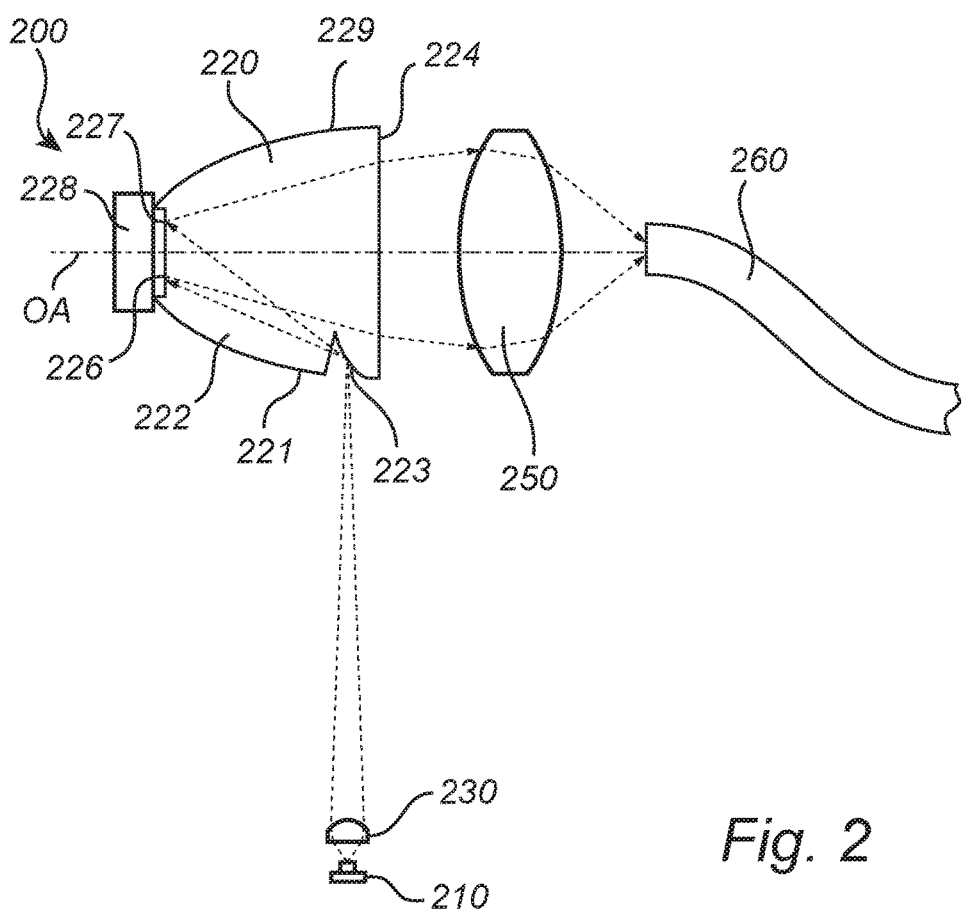
FIG. 2 is a schematic cross sectional side view of an inventive lighting system for producing high brightness light.

In FIG. 2 a lighting system 200 is illustrated. The lighting system 200 comprises a light source 210 and an optical device 220.

The light source 210 is arranged to emit light of a first wavelength. The light source 210 may be a monochromatic light source, for instance emitting blue light. The light source 210 may comprise a laser diode and/or a light emitting diode, LED. The light source 210 may be a high intensity light source. The luminance of the light source 210 is preferably more than 0.5 $GCd/m^2$, more preferably more than 1 $GCd/m^2$, and most preferably more than 3 $GCd/m^2$.

Luminance from the optical device is preferably more than 0.5 $GCd/m^2$, more preferably more than 1 $GCd/m^2$, and most preferably more than 3 $GCd/m^2$.

The optical device 220 comprises a light guide 222 comprising a light entrance 223, a light exit 224, and a light converting member 226. The light entrance 223 is an interface between the light guide 222 and the surroundings, or environment, wherein light may be coupled into the light guide 222. The light exit 224 is an interface between the light guide 222 and the surroundings, or environment, wherein light may be coupled out from the light guide 222. The light converting member 226 and the light exit 224 are arranged along a main optical axis, OA, of the light guide 222. The light entrance 223 is arranged at a geometrical envelope surface 229 (see also FIG. 3) surrounding the main optical axis OA of the light guide 222. The light entrance 223 is physically separated from the light exit 224.

The light entrance 223 may comprise a groove or opening in the light guide 222. A mirror may be arranged at the light entrance 223 for coupling light into the light guide 222. The mirror may be curved. The mirror surface may be coated with a dielectric or metallic reflective layer. Alternatively, or in combination a diffractive grating may be arranged at the light entrance 223 for coupling light into the light guide 222. The diffractive grating may be curved.

The lighting system 200 is arranged such that the light source 210 emits the light of the first wavelength into the light guide 222 via the light entrance 223. For this purpose a light source optical element 230 may be arranged downstream of the light source 210 to guide a beam of light of the first wavelength into the light entrance 223. In this respect the wording downstream means a location in the beam of light emitted by a light source. Alternatively, instead of using the light source optical element 230, the light of the first wavelength may be guided into the light entrance 223 by means of an additional light guide 240, see FIG. 3.

Figure 3:
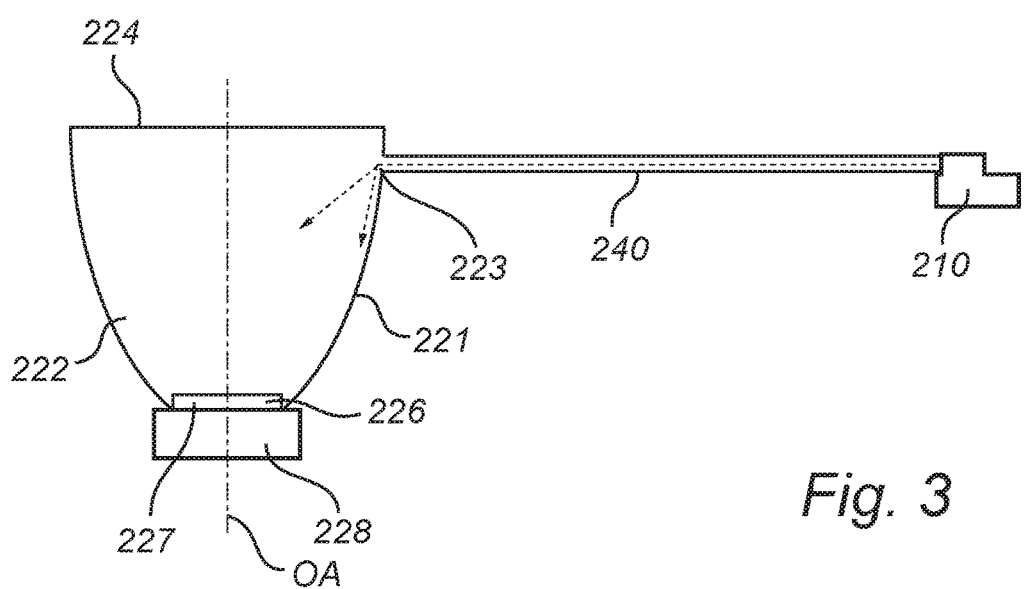
FIG. 3 is a schematic cross sectional side view of an alternative inventive lighting system for producing high brightness light.

FIG. 3 is illustrating an alternative embodiment of the lighting system wherein the light of the first wavelength emitted by the light source 210 is guided to the light entrance 223 by such an additional light guide 240. As illustrated in FIG. 3 the additional light guide 240 may be a separate element. Alternatively, the additional light guide 240 may be an integral part of the light guide 222. In the latter case a virtual interface is obtained between the additional light guide 240 and the light guide 222 forming the light entrance 223. The additional light guide 240 may e.g. be an optical fiber. Hence, light of the first wavelength emitted from the light source 210 may be guided into the light guide 222 via the additional light guide 240. In all embodiments described above and below light of the first wavelength emitted from the light source 210 may be guided into the light guide 222 via the additional light guide 240. The light beam at the light entrance 223 may be redirected towards the light converting member 226 by means of a reflective mirror or diffractive grating.

The light converting member 226 is arranged to at least partly convert incoming light of a first wavelength into light of a second wavelength. For instance, the light converting member 226 may be arranged to convert incoming blue light to yellow light. The light converting member 226 is further arranged to emit light of the second wavelength. The light converting member 226 is further arranged to reflect at least a part of the light of the first wavelength. Hence, the light converting member 226 may be referred to as a reflective light converting member. With reflective light converting member is meant a light converting member being arranged to be irradiated with light at the front surface thereof and to reflect at least a part of the incoming light. The light guide 222 preferably has a parabolic shape. However, other suitable shapes for guiding the light may also be used. The light converting member 226 may be arranged at a focal point of the light guide 222.

The light guide 222 is arranged to guide incoming light of the first wavelength from the light entrance 223 to the light converting member 226 and to guide light emitted and/or reflected from the light converting member 226 to the light exit 224. Hence, the light guide 222 is arranged to transmit light of the first and the second wavelengths.

The light converting member 226 comprises a wavelength converting element 227 and a reflective heat conducting element 228. The wavelength converting element 227 is arranged to at least party convert incoming light of the first wavelength into light of the second wavelength. For instance, the wavelength converting element 227 may be arranged to convert incoming blue light to yellow light.

The wavelength converting element 227 is wedged in between the reflective heat conducting element 228 and the light guide 222.

The wavelength converting element 227 may comprise a phosphor material such as a ceramic phosphor. The ceramic phosphor may be a Ce-doped YAG or LuAg ceramic such as Lumiramic with high thermal conductivity. The light converting member 226 may alternatively or also comprise organic fluorescent dyes or quantum dots.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide (CuInS$_2$) and/or silver indium sulfide (AgInS$_2$) can also be used. Quantum dots show very narrow emission bands and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

The wavelength converting element 227 may in addition or alternatively comprise an inorganic phosphor. Examples of inorganic phosphor materials include, but are not limited to, cerium (Ce) doped YAG ($Y_3Al_5O_{12}$) or LuAG ($Lu_3Al_5O_{12}$). Ce doped YAG emits yellowish light, whereas Ce doped LuAG emits yellow-greenish light. Examples of other inorganic phosphors materials which emit red light may include, but are not limited to ECAS and BSSN; ECAS being $Ca_{1-x}AlSiN_3:Eu_x$ wherein $0<x\le1$, preferably $0<x\le0.2$; and BSSN being $Ba_{2-x-z}M_xSi_{5-y}Al_yN_{8-y}O_y:Eu_z$ wherein M represents Sr or Ca, $0\le x\le1$, $0\le y\le4$, and $0.0005\le z\le0.05$, and preferably $0\le x\le0.2$.

Hence, the luminescent material of the wavelength converting element 227 may essentially be made of material selected from the groups comprising $(M<I>_{1-x-y}M<II>_xM<III>_y)_3(M<IV>_{1-z}M<V>_z)_5O_{12}$, where $M<I>$ is selected from the group comprising Y, Lu or mixtures thereof, $M<II>$ is selected from the group comprising Gd, La, Yb or mixtures thereof, $M<III>$ is selected from the group comprising Tb, Pr, Ce, Er, Nd, Eu or mixtures thereof, $M<IV>$ is Al, $M<V>$ is selected from the group comprising Ga, Sc or mixtures thereof, and $0\le x\le1$, $0\le y\le0.1$, $0\le z\le1$, $(M<I>_{1-x-y}M<II>_xM<III>_y)_2O_3$, where $M<I>$ is selected from the group comprising Y, Lu or mixtures thereof, $M<II>$ is selected from the group comprising Gd, La, Yb or mixtures thereof, $M<III>$ is selected from the group comprising Tb, Pr, Ce, Er, Nd, Eu, Bi, Sb or mixtures thereof, and $0\le x\le1$, $0\le y\le0.1$, $(M<I>_{1-x-y}M<II>_xM<III>_y)S_{1-z}Se_z$, where $M<I>$ is selected from the group comprising Ca, Sr, Mg, Ba or mixtures thereof, $M<II>$ is selected from the group comprising Ce, Eu, Mn, Tb, Sm, Pr, Sb, Sn or mixtures thereof, $M<III>$ is selected from the group comprising K, Na, Li, Rb, Zn or mixtures thereof, and $0\le x\le0.01$, $0\le y\le0.05$, $0\le z\le1$, $(M<I>_{1-x-y}M<II>_xM<III>_y)O$, where $M<I>$ is selected from the group comprising Ca, Sr, Mg, Ba or mixtures thereof, $M<II>$ is selected from the group comprising Ce, Eu, Mn, Tb, Sm, Pr or mixtures thereof, $M<III>$ is selected from the group comprising K, Na, Li, Rb, Zn or mixtures thereof, and $0\le x\le0.1$, $0\le y\le0.1$, $(M<I>_{2-x}M<II>_xM<III>_2)O_7$, where $M<I>$ is selected from the group comprising La, Y, Gd, Lu, Ba, Sr or mixtures thereof, $M<II>$ is selected from the group comprising Eu, Tb, Pr, Ce, Nd, Sm, Tm or mixtures thereof, M<III> is selected from the group comprising Hf, Zr, Ti, Ta, Nb or mixtures thereof, and $0 \leq x \leq 1$, $(M<I>_{1-x}M<II>_{x}M<III>_{1-y}M<IV>_{y})O_3$, where M<I> is selected from the group comprising Ba, Sr, Ca, La, Y, Gd, Lu or mixtures thereof, M<II> is selected from the group comprising Eu, Tb, Pr, Ce, Nd, Sm, Tm or mixtures thereof, M<III> is selected from the group comprising Hf, Zr, Ti, Ta, Nb or mixtures thereof, and M<IV> is selected from the group comprising Al, Ga, Sc, Si or mixtures thereof, and $0 \leq x \leq 0.1$, $0 \leq y \leq 0.1$, or mixtures thereof.

Particularly suitable luminescent materials of the wavelength converting element 227 are Ce doped Yttrium aluminum garnet (YAG, $Y_3Al_5O_{12}$) and/or Lutetium-Aluminum-Garnet (LuAG).

Thermal conductivity of the wavelength converting element 227 is preferably higher than $2 \; W \cdot m^{-1} \cdot K^{-1}$, more preferably higher than $6 \; W \cdot m^{-1} \cdot K^{-1}$, and most preferably higher than $20 \; W \cdot m^{-1} \cdot K^{-1}$.

The wavelength converting element 227 is preferably of the same size as the spot of light of the first wavelength. Typical sizes are 200 μm, 400 μm, and 600 μm in diameter.

The wavelength converting element 227 is in direct thermal contact with the reflective heat conducting element 228. The wavelength converting element 227 may be chemically bonded to the reflective heat conducting element 228. Hence, no organic glue or other material which burns in a high intensity light spot is needed.

The wavelength converting element 227 comprises a front surface arranged to face the light guide 222. The wavelength converting element 227 comprises a back surface, the back surface being opposite the front surface. The reflective heat conducting element 228 is arranged at the back surface of the wavelength converting element 227.

The reflective heat conducting element 228 comprises a reflecting surface. The reflective heat conducting element 228 is arranged to reflect light of the first wavelength. The reflective heat conducting element 228 is arranged to reflect light of the second wavelength. The reflective heat conducting element 228 may comprise a diffraction grating, a mirror or other suitable reflector. Efficient redistributing of light is thereby achieved and the light emission from the optical device 220 is greatly increased.

The reflective heat conducting element 228 is further arranged to distribute heat produced in the wavelength converting element 227. The reflective heat conducting element 228 may comprise a material chosen from the group of materials comprising silver; aluminum; boron nitride; microcellular formed polyethylene terephthalate, MCPET; translucent polycrystalline alumina ceramics, PCA; titanium oxide, $TiO_2$; or a combinations thereof. The reflective heat conducting element 228 may comprise a specular or diffuse reflecting material such as aluminum or silver. The reflecting element may also comprise boron nitride or aluminum oxide providing reflection and improved thermal conductivity for improved thermal management. Thermal conductivity of the reflective heat conducting element 228 is preferably higher than $2 \; W \cdot m^{-1} \cdot K^{-1}$, more preferably higher than $6 \; W \cdot m^{-1} \cdot K^{-1}$, and most preferably higher than $20 \; W \cdot m^{-1} \cdot K^{-1}$. The wavelength converting element 227 is in thermal contact with the reflective heat conducting element 228.

The wavelength converting element 227 may be in direct thermal contact with the reflective heat conducting element 228. This may be achieved by chemically bonding the wavelength converting element 227 to the reflective heat conducting element 228. Hence, no organic glue or other material which burns in a high intensity light spot is needed. Efficient redistributing and emission of heat is thereby achieved and the light emission from the lighting system 200 may be increased. This will reduce the heat load on the wavelength converting element 227. Quantum efficiency of the wavelength converting element 227 is thus increased.

Figure 4:
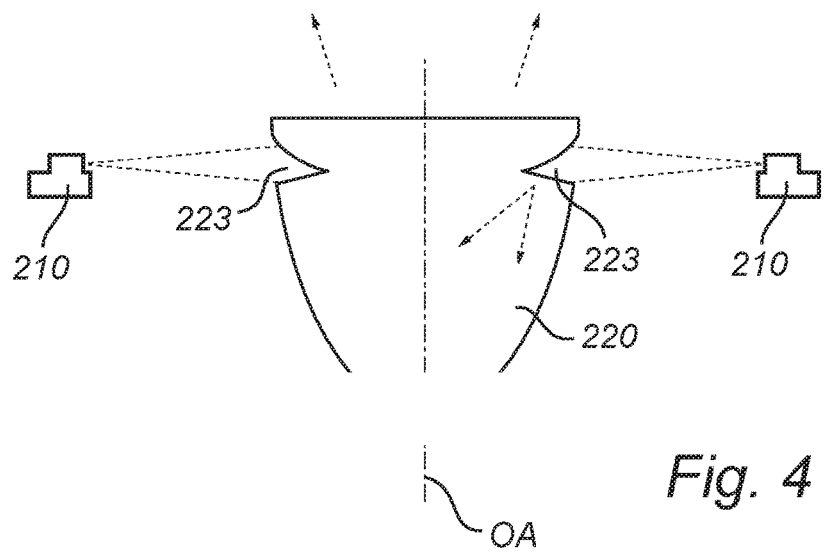
FIG. 4 is a schematic cross sectional side view of yet an alternative inventive lighting system for producing high brightness light.

According to the embodiments of FIGS. 2, 3 and 4 the light guide 222 is a compound parabolic concentrator, CPC. The CPC is a solid body. The wavelength converting element 227 is in direct thermal contact with the light guide 222 in the form of the CPC.

The CPC comprises material with high heat conductivity. Hence, the CPC is arranged to distribute heat produced in the wavelength converting element 227. This will reduce the heat load on the wavelength converting element 227. Quantum efficiency of the wavelength converting element 227 is thus increased. Efficient redistributing and emission of heat is thereby achieved and the light emission from the lighting system 200 may be increased.

The wavelength converting element 227 may be chemically bonded to the CPC. Hence, no organic glue or other material which burns in a high intensity light spot is needed. Alternatively, the wavelength converting element 227 may be embedded in the CPC. By embedding the wavelength converting element 227 in the CPC, the heat conductivity away from the wavelength converting element 227 may be enhanced. Further this also enables side cooling of the wavelength converting element 227.

Thermal conductivity of the CPC is preferably higher than $2 \; W \cdot m^{-1} \cdot K^{-1}$, more preferably higher than $6 \; W \cdot m^{-1} \cdot K^{-1}$, and most preferably higher than $20 \; W \cdot m^{-1} \cdot K^{-1}$.

The CPC may be made of ceramic material, CaF, $Al_2O_3$, diamond and/or glass. As mentioned above the wavelength converting element 227 may comprise a doped portion of a ceramic material, e.g. yttrium aluminum garnet, YAG or lutetium aluminum garnet, LuAG. If so, the CPC is preferably YAG or LuAG, respectively.

The lighting system 200 may further comprise an optical element 250 arranged to collect the light emitted from the optical device 220. The optical element 250 is in FIG. 2 illustrated as a lens but the skilled person in the art realizes that other lenses or mirrors and lens or mirror systems may be used. For example the optical element 250 may be formed as an integral part of the light guide 222.

The optical element 250 may further be arranged to focus the collected light into a mixing element 260. The mixing element 260 is arranged to mix light entering the mixing element 260. The light entering the mixing element 260 originates from the optical device 220 and may comprise a spatially varying spectral composition, i.e. light of the first and the second wavelength may be separated in space. The light that enters the mixing element 260 is mixed spatially by for instance multiple reflections and/or diffraction. Light leaving the mixing element 260 may thereby have a spatially more uniform spectral distribution than the light entering the mixing element 260. A lighting system 200 providing a spatially more uniform output of light may thereby be obtained. The mixing element 260 may be an optical fiber or a light guide. The optical function of the mixing element 260 may be transportation of the light beam to another location.

As mentioned above, the light of the first wavelength may be blue light and the light of the second wavelength may have a longer wavelength than the first wavelength, such as yellow light. A combination of the blue and the yellow light may produce white light. By mixing the blue and the yellow light with the mixing element 260 the lighting system 200 may provide white light with a more uniform spectral distribution.

The mixing element 260 may be an optical fiber. A simple, cost effective and flexible mixing element 260 may thereby be achieved. The light entering the mixing element 260 may further propagate efficiently in the core of the optical fiber by total internal reflection. The mixing element 260 may alternatively be a transparent rod. The cross-section of the rod or the optical fiber may be non-circular, for instance having a square, hexagonal or octagonal cross-section in order to improve light mixing.

The person skilled in the art realizes that the present invention by no means is limited to the preferred embodiments described above. On the contrary, many modifications and variations are possible within the scope of the appended claims.

The reflective heat conducting element 228 may be in direct thermal contact with the light guide 222. This will enhance the heat conductivity away from the wavelength converting element 227 being wedged in between the reflective heat conducting element 228 and the light guide 222.

The wavelength converting element 227 and the CPC may be sintered into a single element.

The reflective heat conducting element 228 and the CPC may be made of a similar material.

As illustrated in FIG. 4 the light guide 222 may comprise a plurality of light entrances 223 receiving light from a plurality of light sources 210. This may increase the power and light output of the lighting system. This may also improve the homogeneity of the beam profile of the outgoing light from the optical device.

Figure 5:
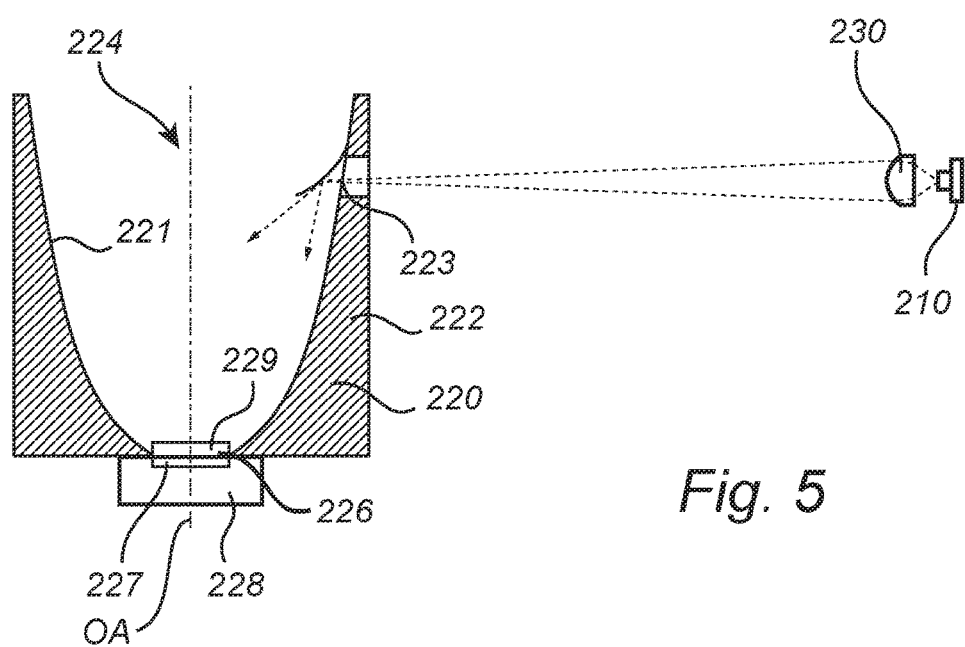
FIG. 5 is a schematic cross sectional side view of a further alternative inventive lighting system for producing high brightness light.

In the embodiments discussed above in connection with FIGS. 2-4 the light guide 222 was in the form of a CPC. However, instead of using a CPC it is also possible to use a parabolic reflector. This is illustrated in FIG. 5. In all embodiments described above and below a light guide in the form of a parabolic reflector may be used instead for the CPC. The parabolic reflector comprises a metal, a ceramic material or a glass material. The parabolic reflector further comprises a reflective surface comprising Al, Ag or a multilayer structure. It may also make use of total internal reflection, TIR. Further, using a parabolic reflector a transparent heat conducting element 229 may be arranged on top of the wavelength converting element 227. This will enhance the heat conductivity away from the wavelength converting element 227 being wedged in between the reflective heat conducting element 228 and the transparent heat conducting element 229.

Furthermore, the light entrance may be arranged at the same surface of the light guide as the light exit. Hence, according to this embodiment the light entrance is arranged at the opposite surface of the light guide as compared to the light converting member. The incoming light of the first wavelength may according to this embodiment be coupled into the light guide via a diffractive grating. The diffractive grating may be arranged such that it diffracts the light of the first wavelength. The diffractive grating may be arranged such that it substantially does not affect the propagation of light of the second wavelength.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. An optical device comprising:
    a light converting member arranged to at least partly convert incoming light of a first wavelength into light of a second wavelength, to emit light of the second wavelength, and to reflect at least a part of the light of the first wavelength; and
    a light guide comprising a light entrance and a light exit, the light guide being arranged to guide incoming light, generated external to the light guide, of the first wavelength from the light entrance to the light converting member and to guide light emitted or reflected from the light converting member to the light exit;
    wherein the light entrance redirects the incoming light toward the light converting member,
    wherein the light converting member and the light exit are arranged at opposite surfaces of the light guide,
    wherein the light guide has sidewalls extending between the opposite surfaces of the light guide that do not wavelength-convert the incoming light and that direct the reflected and converted light from the light converting member to the light exit,
    wherein the light converting member and the light exit are arranged along a main optical axis (OA) of the light guide,
    wherein the light entrance is arranged separated from the light exit at a geometrical envelope surface surrounding the main optical axis (OA) of the light guide for coupling the incoming light of the first wavelength into the light guide from the side of the light guide,
    wherein the light entrance has a first surface formed in the envelope surface of the light guide that receives the incoming light, wherein the first surface redirects the incoming light toward the light converting member,
    wherein the light entrance does not intersect the main optical axis of the light guide, and
    wherein the light entrance is configured such that a majority of light emitted and reflected by the light converting member toward the light exit does not impinge on the first surface.

2. The optical device according to claim 1, wherein the light guide has a parabolic shape.

3. The optical device according to claim 1, wherein the luminance from the optical device is higher than 0.5 GCd/m$^2$.

4. The optical device according to claim 1, wherein the light guide is a compound parabolic concentrator.

5. The optical device according to claim 1, wherein the light guide comprises yttrium aluminum garnet YAG, sapphire, or $CaF_2$.

6. The optical device according to claim 1, wherein the light guide is a parabolic reflector.

7. The optical device according to claim 6, wherein the parabolic reflector comprises a metal, a ceramic material, or a glass material.

8. The optical device according to claim 6, wherein the parabolic reflector comprises a reflective surface comprising Al, Ag, or a multilayer structure.

9. The optical device according to claim 1, wherein the light entrance comprises a mirror.

10. The optical device according to claim 1, wherein the light entrance comprises a diffraction grating.

11. The optical device according to claim 1, further comprising a reflective heat conducting element.

12. The optical device according to claim 1, wherein the light guide comprises a plurality of light entrances.

13. A lighting system comprising:
an optical device according to claim 1, and
a light source arranged to emit light of a first wavelength.

14. The lighting system according to claim 13, further comprising an additional light guide arranged to guide light from the light source to the light entrance of the optical device.

* * * * *